United States Patent
Takamura

(10) Patent No.: US 7,164,722 B2
(45) Date of Patent: Jan. 16, 2007

(54) RADIO COMMUNICATIONS SYSTEM, TRANSMITTER, RECEIVER, RADIO TRANSMISSION METHOD, RADIO RECEPTION METHOD AND COMPUTER PROGRAM THEREFOR

(75) Inventor: Kazuhisa Takamura, Tokyo (JP)

(73) Assignee: Sony Corporation (JP)

( * ) Notice: Subject to any disclaimer, the term of this patent is extended or adjusted under 35 U.S.C. 154(b) by 718 days.

(21) Appl. No.: 10/216,528

(22) Filed: Aug. 9, 2002

(65) Prior Publication Data

US 2003/0035465 A1    Feb. 20, 2003

(30) Foreign Application Priority Data

Aug. 17, 2001    (JP) ............................ P2001-247993

(51) Int. Cl.
```
H03K 7/08      (2006.01)
H03K 8/08      (2006.01)
H03K 7/02      (2006.01)
H03K 9/02      (2006.01)
H03K 7/04      (2006.01)
H03G 1/00      (2006.01)
```

(52) U.S. Cl. ...................... 375/259; 375/238; 375/239; 375/353; 375/343; 332/112; 332/115

(58) Field of Classification Search ................ 375/130, 375/140–142, 147, 146, 150, 238, 239, 353, 375/316, 259, 340, 343; 332/112, 115; 370/212, 370/213; 329/315–317, 313, 347; 341/178
See application file for complete search history.

(56) References Cited

U.S. PATENT DOCUMENTS

| | | | | |
|---|---|---|---|---|
| 5,323,419 A | * | 6/1994 | Mori et al. ................. | 375/142 |
| 5,345,472 A | * | 9/1994 | Lee ........................... | 370/342 |
| 5,757,853 A | * | 5/1998 | Tsujimoto ................... | 375/141 |
| 5,923,651 A | * | 7/1999 | Struhsaker ................. | 370/342 |
| 5,956,373 A | * | 9/1999 | Goldston et al. ........... | 375/298 |
| 5,987,015 A | * | 11/1999 | Matui ........................ | 370/335 |
| 6,031,862 A | * | 2/2000 | Fullerton et al. ........... | 375/146 |
| 6,175,270 B1 | * | 1/2001 | Vannucci ..................... | 330/2 |
| 6,603,818 B1 | * | 8/2003 | Dress et al. ................ | 375/295 |
| 6,778,603 B1 | * | 8/2004 | Fullerton et al. .......... | 375/238 |
| 6,952,456 B1 | * | 10/2005 | Aiello et al. ............... | 375/295 |
| 2002/0018514 A1 | * | 2/2002 | Haynes et al. .............. | 375/130 |
| 2002/0101936 A1 | * | 8/2002 | Wright et al. .............. | 375/296 |
| 2003/0147480 A1 | * | 8/2003 | Richards et al. ............ | 375/343 |

\* cited by examiner

*Primary Examiner*—Tesfaldet Bocure
*Assistant Examiner*—Vineeta Panwalkar
(74) *Attorney, Agent, or Firm*—Lerner, David, Littenberg, Krumholz & Mentlik, LLP

(57) ABSTRACT

A radio communications system in which a desired signal can be accurately discriminated from interfering signals, even when signals from a plurality of transmitters are received simultaneously, in which a transmitter communicates information using signals that are repeated over predetermined periods. A pulse generator generates pulses having a predetermined repetition period based on an information bit to be communicated, and the pulses generated by the pulse generator are transmitted. A pulse amplitude altering unit controls the amplitude of the pulses to be transmitted in accordance with a predefined pattern under the control of a control unit.

16 Claims, 9 Drawing Sheets

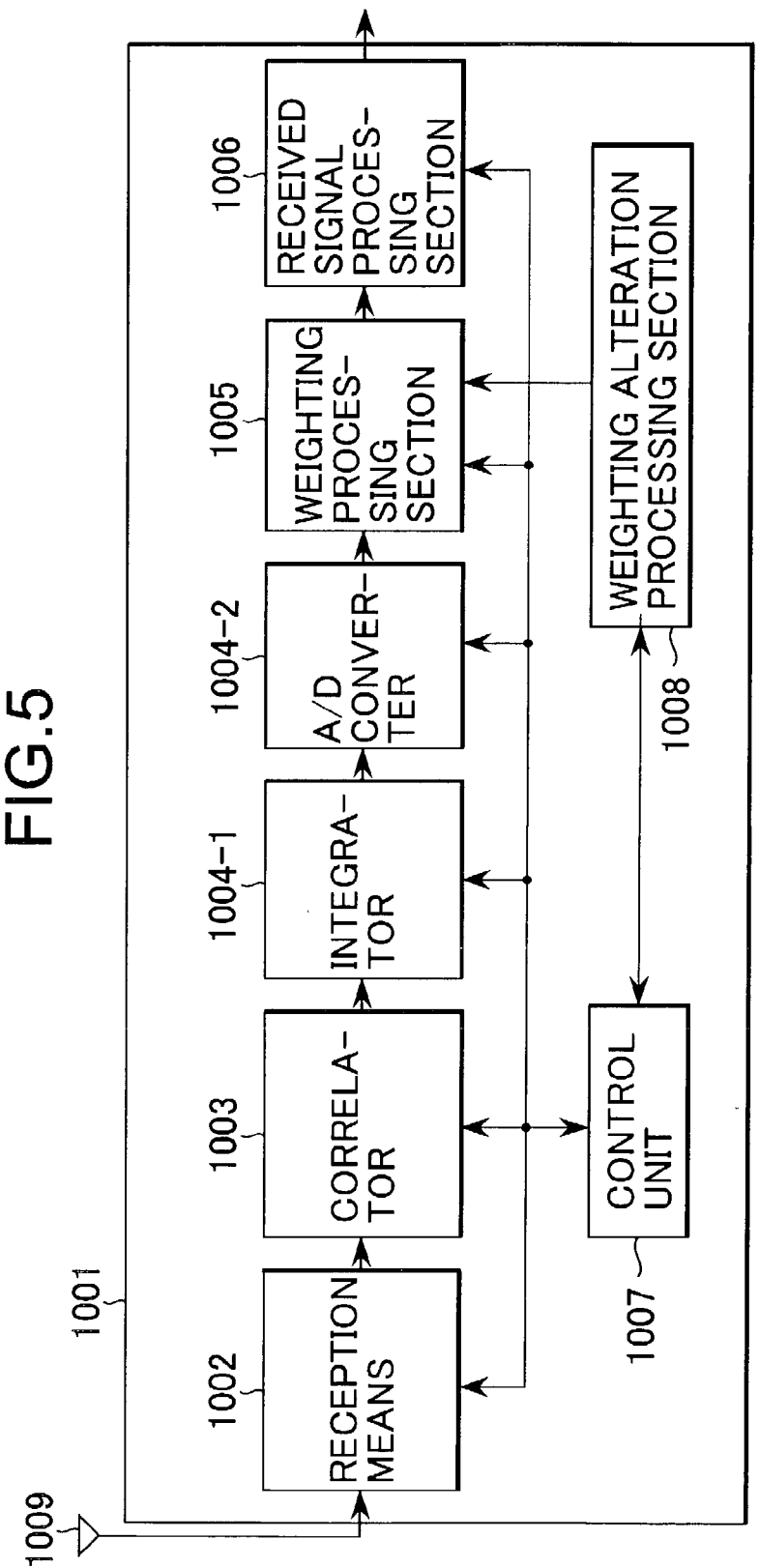

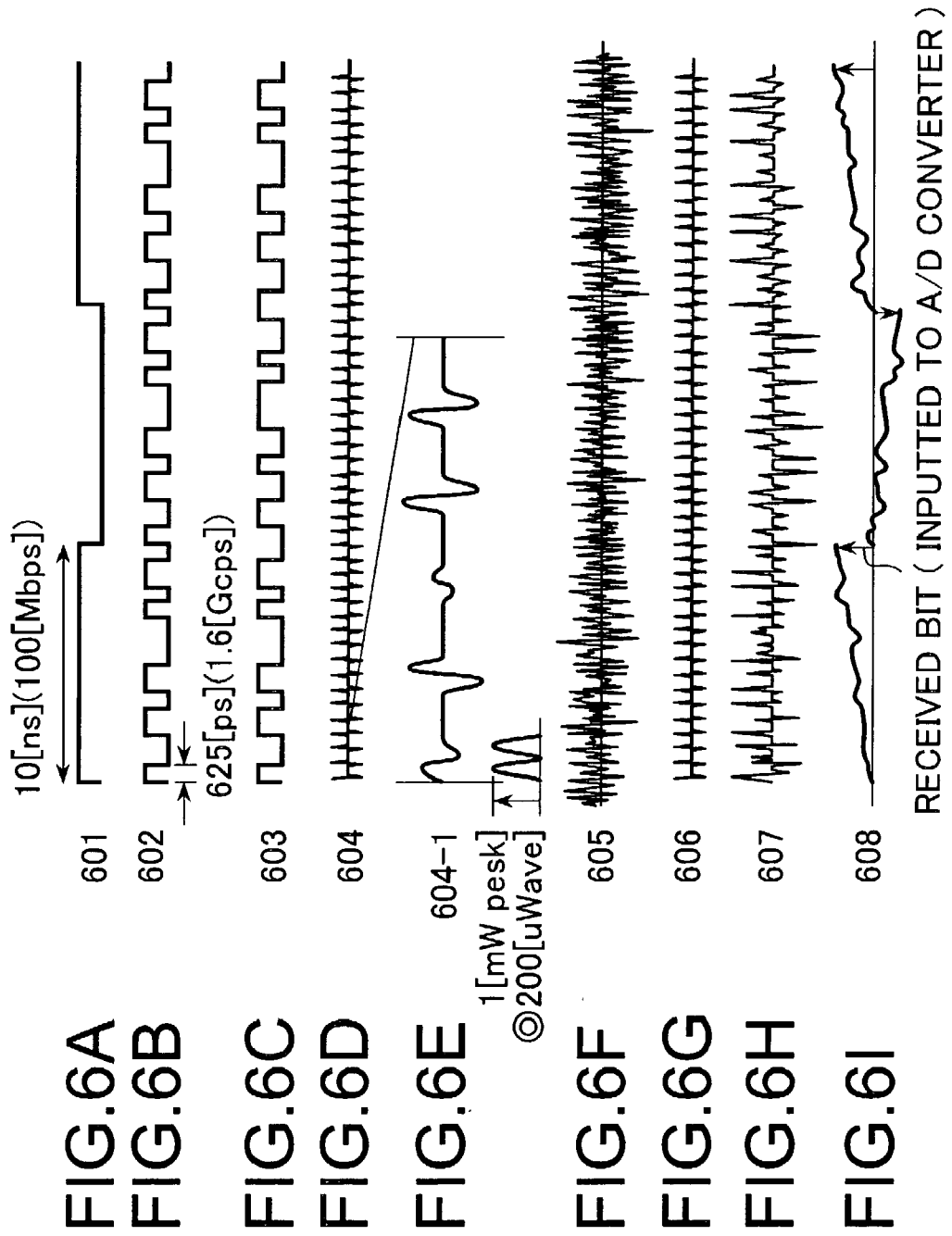

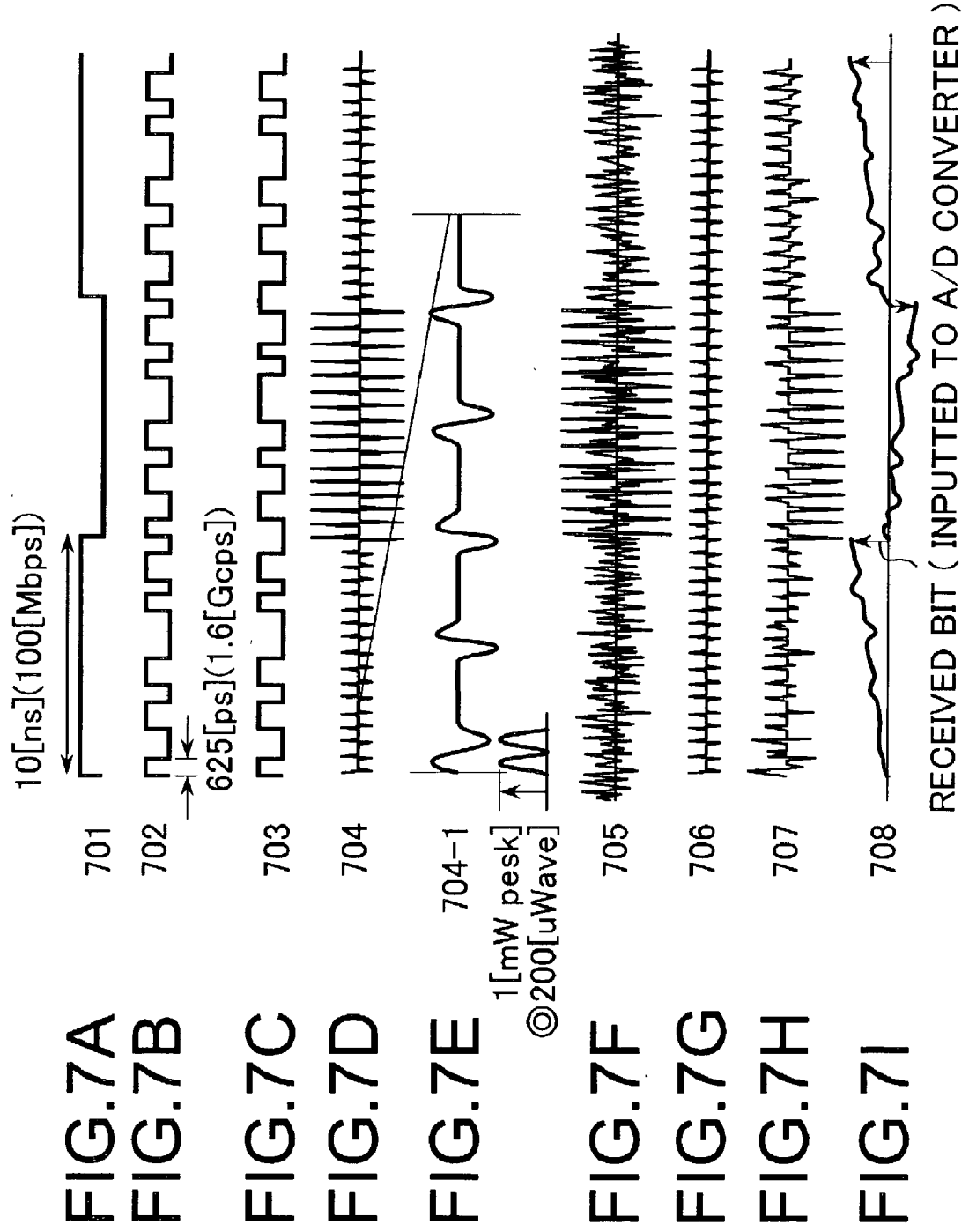

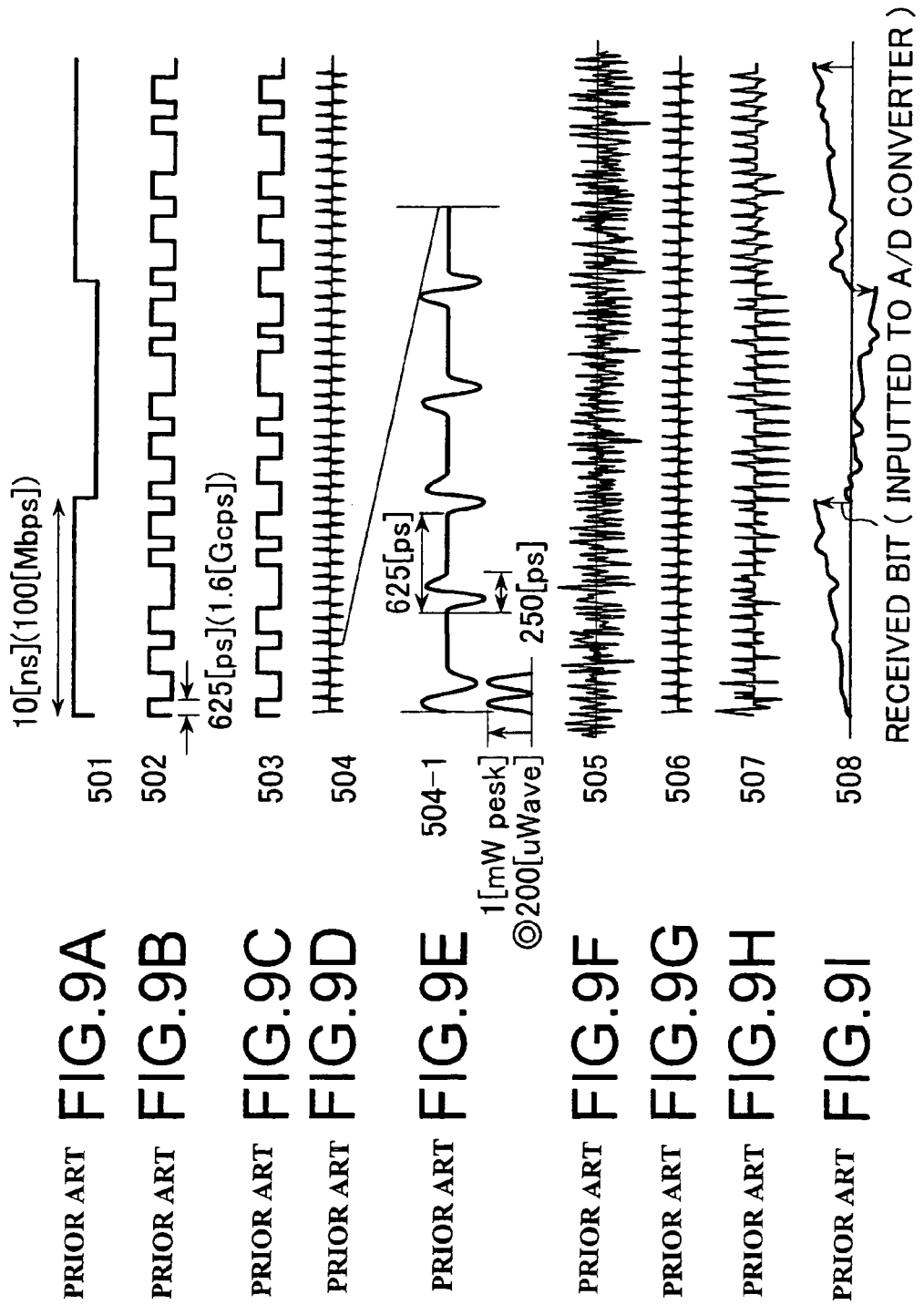

RADIO COMMUNICATIONS SYSTEM, TRANSMITTER, RECEIVER, RADIO TRANSMISSION METHOD, RADIO RECEPTION METHOD AND COMPUTER PROGRAM THEREFOR

CROSS REFERENCE TO RELATED APPLICATIONS

The present application claims priority to Japanese Priority Document JP 2001-247993, filed in the Japanese Patent Office on Aug. 17, 2001, the entire contents of which are incorporated herein by reference to the extent permitted by law.

BACKGROUND OF THE INVENTION

1. Field of the Invention

The present invention relates to a radio communications system, a transmitter, a receiver, a radio transmission method, a radio reception method and a computer program therefor.

2. Description of Related Art

FIGS. 8A and 8B schematically show a radio communications system for communicating information using impulse signals. A transmitter 101 uses an impulse signal sequence comprising consecutive impulses having a predetermined impulse period as shown in FIG. 8B to communicate information to a receiver 102. Examples of such an information communicating method using an impulse signal sequence include Ultra Wide Band (UWB) communications systems and the like. UWB communications systems communicate information by transmitting impulse signals at predetermined repetition periods. In other words, a base band communication is performed using a signal comprising pulse sequences having a very narrow pulse width (e.g., 1 ns (nanosecond) or less). The occupied bandwidth is on the order of GHz and is such that the value obtained by dividing the occupied bandwidth by the center frequency thereof (e.g., 1 GHz to 10 GHz) is approximately 1. The above-mentioned bandwidth is much greater than bandwidths ordinarily used for wireless LAN communications employing W-CDMA®, CDMA2000®, SS (Spread Spectrum), OFDM (Orthogonal Frequency Division Multiplexing) technologies and the like.

UWB communications schemes are characteristic in that, due to the low power spectral density properties thereof, they hardly interfere with other radio communications systems. Therefore, there are expectations for UWB communications as a technology capable of overlaying frequency bands used by existing radio communications systems. Further, because ultra wide bandwidths are used, UWB communications is viewed as a promising technology which could realize ultra high-speed radio communications on the order of 100 Mbps in its application to personal area network (PAN) technology.

In communicating information using the impulse signals mentioned above, the amplitude of each of the impulses constituting the impulse signals are handled by a transmitter and a receiver as being constant.

FIGS. 9A through 9I explain a UWB communications scheme which is an example of a method of communicating information using an impulse signal sequence. In UWB communications, 1 bit of information to be communicated from a transmitting end is transmitted using several impulses. Namely, 1 bit of information 501 (FIG. 9A) is directly spread using a predetermined spreading code 502 (FIG. 9B), and is thereafter converted into a spread signal 503 (FIG. 9C). Corresponding to its value of 0 or 1, the spread signal 503 is converted into a very fine impulse sequence and is transmitted as a transmission signal 504 by way of an antenna. FIG. 9E is an enlarged view of a portion 504-1 showing the first few pulses of the transmission signal 504. As is apparent therefrom, in UWB schemes, the amplitude of each transmitted pulse is uniform.

On a receiving end, a signal, which is the transmission signal 504 onto which noise is superimposed, is received as a received signal 505 (FIG. 9F). The received signal 505 is despreaded using a predetermined despreading code 506 (FIG. 9F). In other words, the received signal 505 is detected with a correlator, and a correlator output 507 (FIG. 9H) is obtained. A spreading code is integrated in the correlator output 507, and the correlator output 507 becomes an integrated signal 508 (FIG. 9I).

Problems associated with radio communications systems using conventional impulse signals are explained below. FIG. 10 shows an arrangement of a radio communications system in which each of receivers 202 and 204 receives a signal from a plurality of transmitters 201 and 203. In this case, when a condition arises whereby the transmitters 201 and 203 happen to start transmission at an identical pulse position, each of the receivers 202 and 204 simultaneously receives pulses from the transmitters 201 and 203. If there is a large power difference between the pulses from the desired (relevant) transmitter and the pulses from an interfering transmitter, the pulses with greater power is received due to the "Capture Effect." On the other hand, when the power difference between the desired transmitter and the interfering transmitter is small, neither of the pulses are received and both pulses are lost.

Especially in a PAN, because a base station is often absent, it is rare for transmission power control at the transmitter to be performed. Therefore, the closer a transmitter is to a receiver, the greater the power of the received pulse becomes. Thus, when the interfering transmitter is at a position closer to the receiver than the desired transmitter is, due to the capture effect mentioned above, only interfering pulses are received.

SUMMARY OF THE INVENTION

The present invention addresses such an issue as presented above, and provides a transmitter, a receiver and a radio communications system for performing transmission using an impulse signal sequence, wherein the transmitter, receiver and radio communications system are capable of accurately discriminating between an interference signal and a desired signal even when signals from multiple transmitters are received at once.

In order to overcome the issue presented above, the present invention comprises certain characteristics as described hereinafter.

In a radio communications system which communicates information using an impulse signal sequence comprising impulses having a predetermined impulse period, one aspect of the present invention is that a transmitter for such a system comprises: impulse signal sequence generating means for generating an impulse signal sequence based on a spread signal obtained by spreading an information bit to be communicated using a spreading code; control means for controlling the amplitude of the impulse signal sequence generated by the impulse signal sequence generating means mentioned above in accordance with a predefined pattern; and transmission means for transmitting the impulse signal sequence received from the impulse signal sequence generating means and whose amplitude has been controlled.

In relation to what is described above with respect to one aspect of the present invention, the impulse signal sequence generating means may be such that it comprises a transmission data processing section, a transmission buffer, a pulse forming section, an amplifier, and a pulse generator. Further, the control means may comprise a control unit and pulse amplitude altering means.

In a radio communications system which communicates information using impulse signal sequences comprising impulses having a predetermined impulse period, a second aspect of the present invention is that a receiver for such a system comprises: radio reception means for receiving a radio signal including an impulse signal sequence whose impulse amplitude is altered in accordance with a predefined pattern, and for obtaining a correlated output signal of the radio signal and a spreading code; amplifying means for amplifying the correlated output signal mentioned above; and control means for controlling the amplifying operation of the amplifying means mentioned above according to a predefined pattern.

In relation to what is described above with respect to the second aspect of the present invention, the radio reception means may be such that it comprises reception means, and a correlator. Further, the amplifying means may comprise an amplifier, and the control means may comprise a control unit and an amplification factor alteration processing section.

In a radio communications system which communicates information using an impulse signal sequence comprising impulses having a predetermined impulse period, a third aspect of the present invention is that a receiver for such a system comprises: radio reception means for generating a correlated output signal of a radio signal including an impulse signal sequence, whose impulse amplitude is altered based on a predefined pattern, and a spreading code; a weighting processing section for weighting an information value, which is generated from the correlated output signal mentioned above; and control means for controlling the weighting operation of the weighting processing section mentioned above based on a pattern corresponding to the predefined pattern mentioned above.

In relation to what is described above with respect to the third aspect of the present invention, the radio reception means may be such that it comprises, for example, reception means, a correlator, an integrator, and an A/D converter. Further, the control means may comprise a control unit and a weighting alteration processing section.

According to the present invention, even in cases where pulses from a plurality of transmitters are received simultaneously, the desired pulses can be accurately discriminated from interfering pulses, and thus therein lies an advantage in that appropriate processing can be performed with respect to the received signal.

BRIEF DESCRIPTION OF THE DRAWINGS

The invention disclosed herein will become better understood as a detailed description is made of the preferred embodiments with reference to the appended drawings in which:

FIG. 5 shows the configuration of a receiver 1001 according to an embodiment of the present invention.

FIG. 6A through FIG. 6I are time charts illustrating procedures of a communications scheme of the first embodiment of the present invention.

FIG. 7A through FIG. 7I are time charts illustrating the procedures of a communications scheme of the second embodiment of the present invention.

FIG. 9 illustrates procedures of a communications scheme using an impulse signal sequence.

DETAILED DESCRIPTION OF THE PREFERRED EMBODIMENTS

Figure 1:
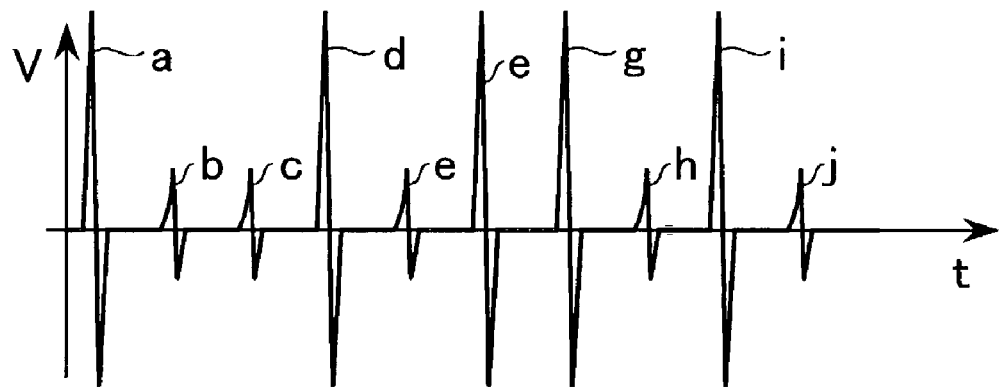
FIG. 1 is a schematic view illustrating a first embodiment of the present invention.
Figure 2:
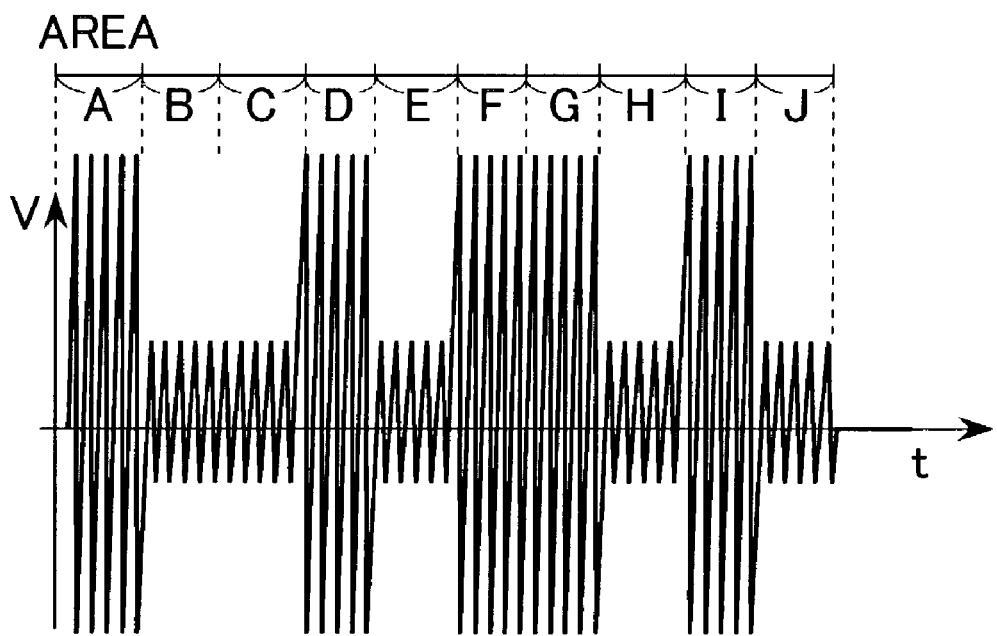
FIG. 2 is a schematic view illustrating a second embodiment of the present invention.

First, an outline of the present embodiments will be described. One characteristic of the embodiments described herein is that they change the amplitude of pulses to be transmitted according to a predefined pattern. FIG. 1 illustrates a first embodiment of the present invention, and FIG. 2 illustrates a second embodiment of the present invention. In FIGS. 1 and 2, the X-axis represents time (t) and the Y-axis represents voltage (V).

In the first embodiment shown in FIG. 1, the amplitude of each pulse (a to j in FIG. 1) to be transmitted is altered according to a predefined pattern. In FIG. 1, the amplitudes of pulses b, c, e, h and i are smaller than those of pulses a, d, f, g and i.

In the second embodiment shown in FIG. 2, the amplitudes of a plurality of impulses (A to H in FIG. 2) to be transmitted are altered in groups in accordance with a predefined pattern.

The example shown in FIG. 2 illustrates an impulse signal sequence after an alteration of the amplitudes is performed in accordance with the predefined pattern mentioned above. The amplitudes of the pulses included in areas B, C, E, H and J are set to be smaller than those of the pulses included in areas A, D, F, G and I. By thus altering the amplitudes of the pulses to be transmitted in groups, each group comprising a plurality of pulses, a situation in which only interference pulses are received due to the "Capture Effect" may be avoided. It is noted that various methods of grouping a plurality of pulses may be adopted. For example, units by which amplitude alteration is performed may be defined as: a predetermined number of consecutive pulses; a plurality of pulses which correspond to the length of several spreading codes; one transmission frame; or any other arbitrary definition of a unit as may be deemed appropriate.

Figure 3:
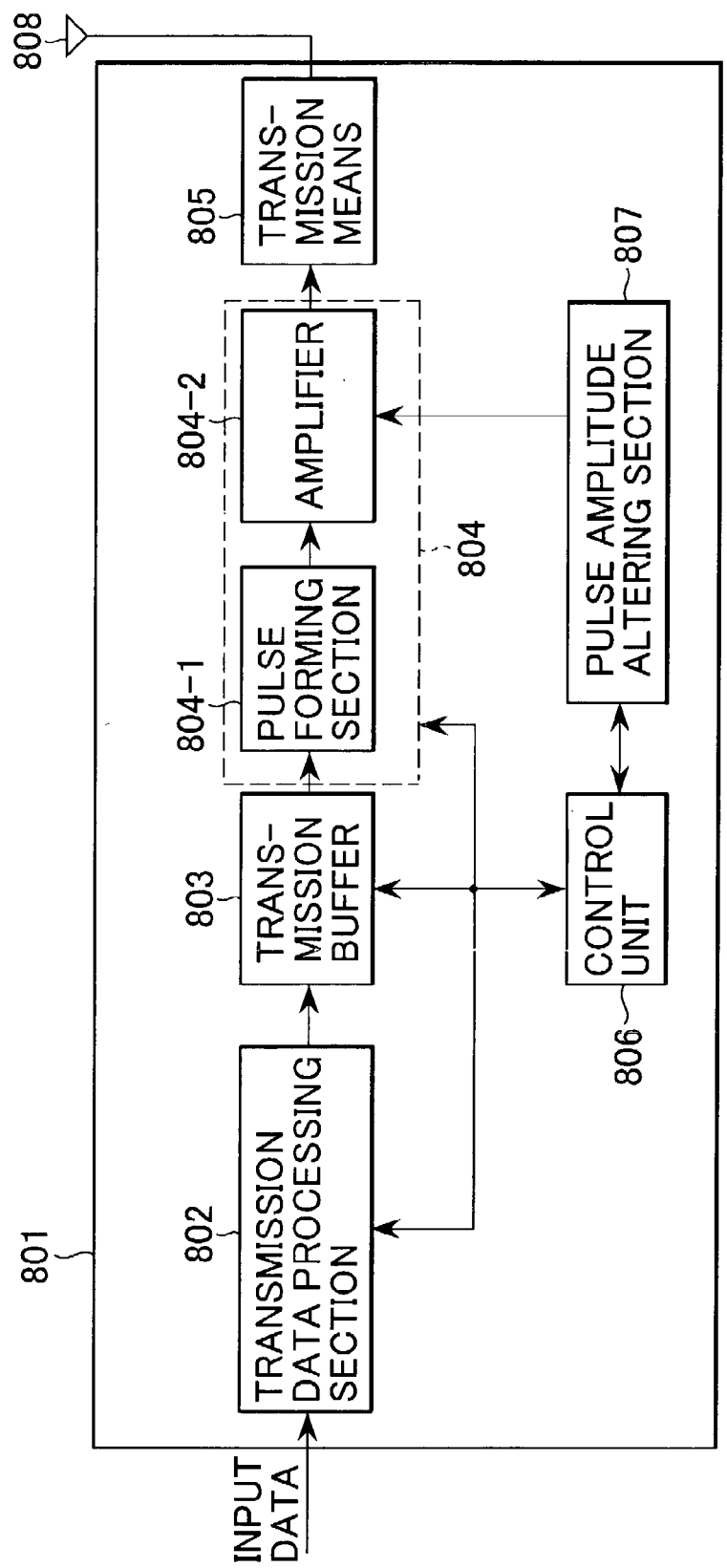
FIG. 3 shows the configuration of a transmitter 801 according to an embodiment of the present invention.

FIG. 3 illustrates the configuration of a transmitter 801 of the radio communications system of the present embodiments. In FIG. 3, a transmission data processing section 802 converts an inputted information bit into a spread signal using a predetermined spreading code. A transmission buffer 803 temporarily stores the spread signal. A pulse generator 804 reads out the spread signal and generates a corresponding pulse sequence. Transmission means 805 comprises an RF circuit and the like, and outputs the pulse sequence across the air by way of an antenna 808. A control unit 806 controls the timing of signal processing and the like at each of the sections mentioned above.

Further, the pulse generator 804 has a pulse forming section 804-1 that generates a pulse sequence based on the spread signal from the transmission buffer 803, and an amplifier 804-2 that amplifies this pulse sequence. A pulse amplitude altering section 807 is connected to the amplifier 804-2. The pulse amplitude altering section 807, under the control of the control unit 806, controls the amplification factor of the amplifier 804-2 according to a predefined amplitude pattern, and alters the amplitude of the pulses using one of the two methods mentioned above. In practice, the control unit 806 may comprise a central processing unit (CPU), and the CPU may follow instructions of a program stored in a storage device not shown in drawing (for example, an EEPROM (Electrically Erasable Programmable Read-Only Memory) and the like), and accordingly control the amplification factor of the amplifier 804-2 in accordance with a predefined amplitude pattern. The above-mentioned pulse altering operation includes an operation where the amplitude is equal to 0, in other words, where no pulse is transmitted.

Figure 4:
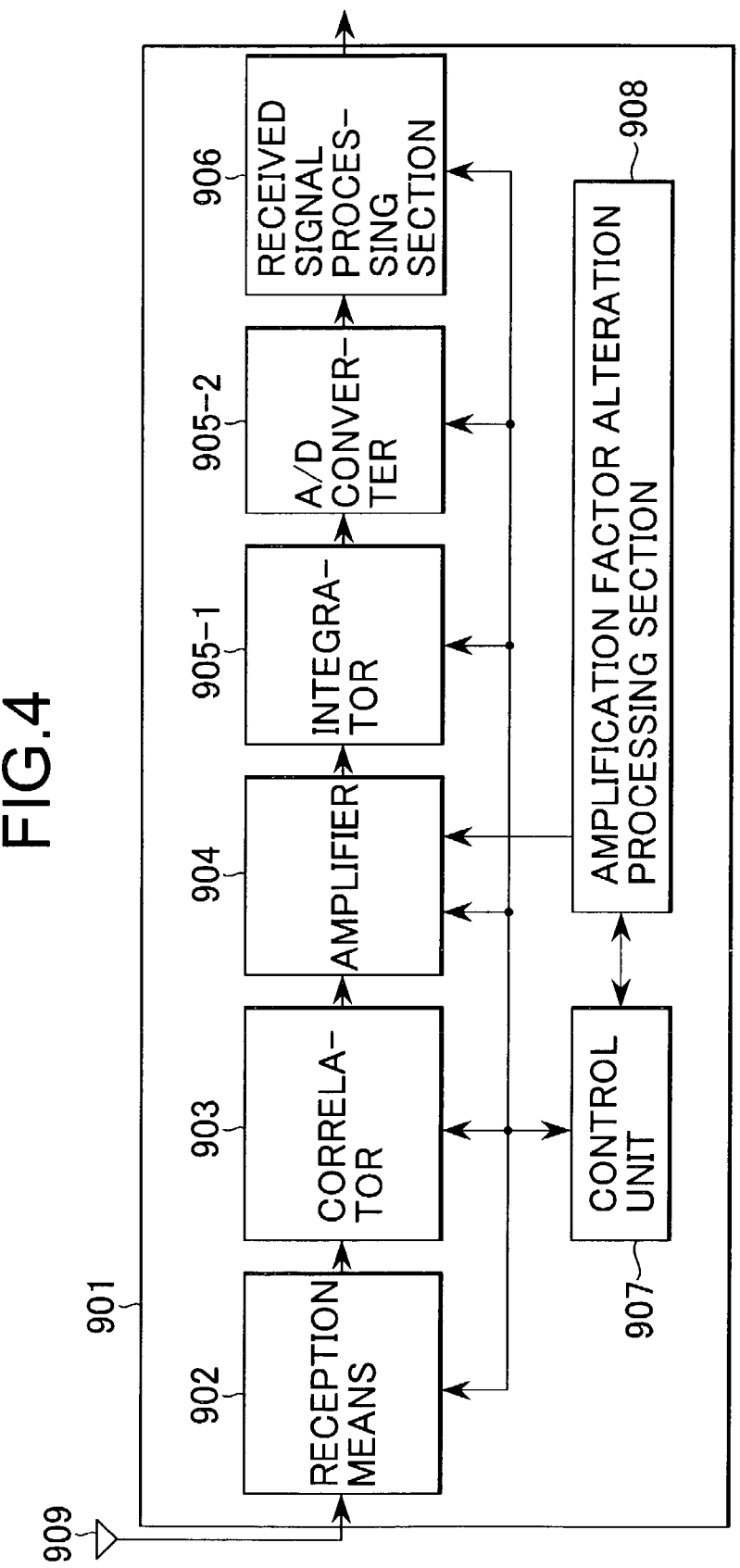
FIG. 4 shows the configuration of a receiver 901 according to an embodiment of the present invention.
Figure 8A:
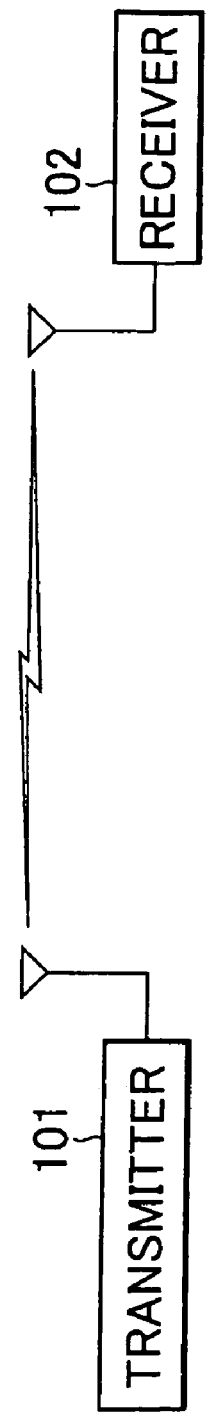
FIG. 8A and FIG. 8B are schematic views illustrating a radio communications system using an impulse signal sequence.
Figure 8B:
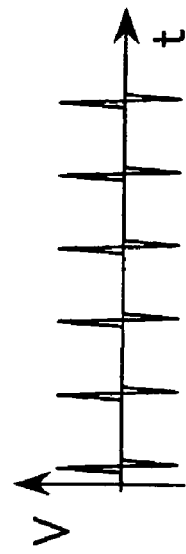
Figure 10:
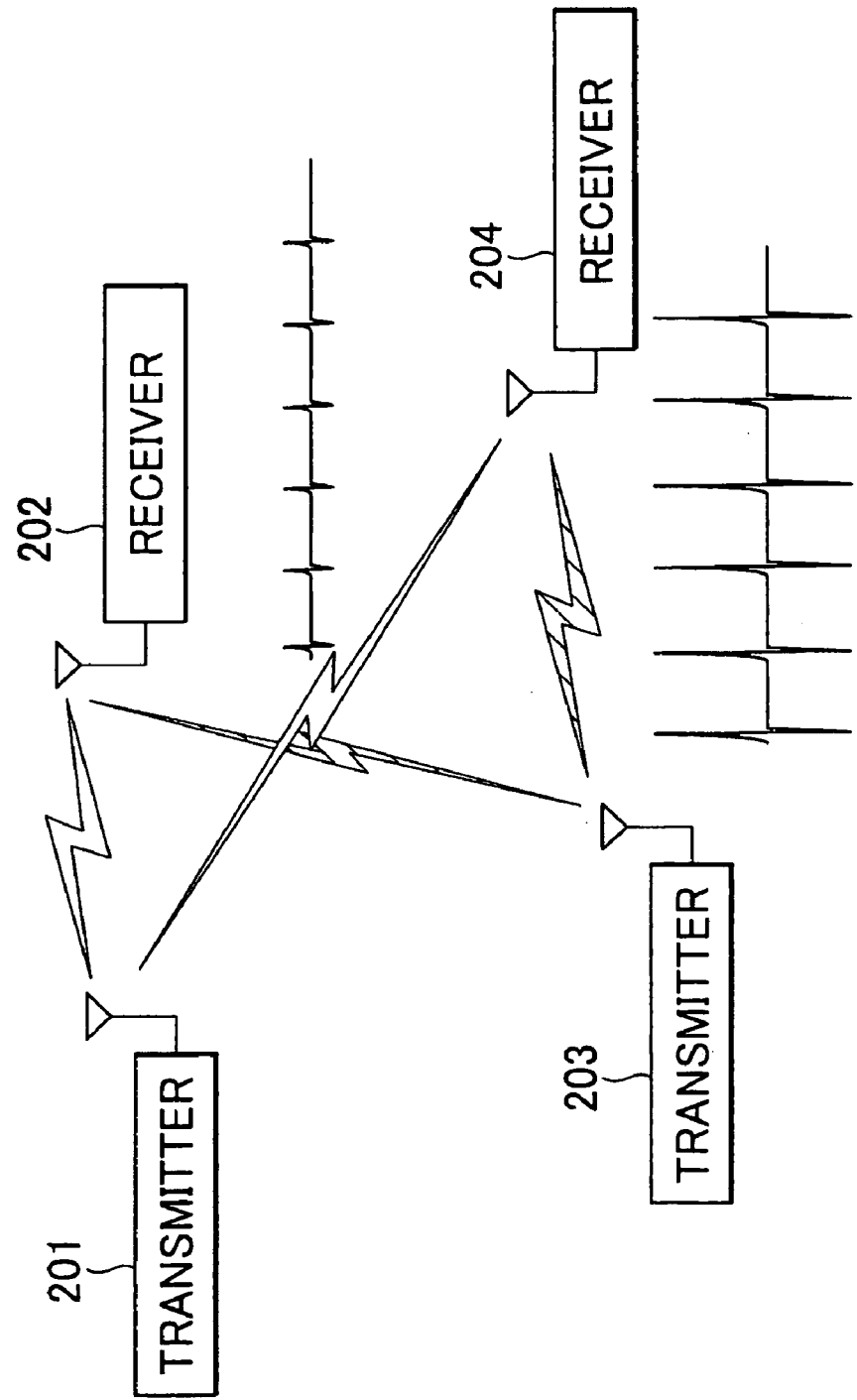
FIG. 10 illustrates problems associated with a conventional communications scheme using an impulse signal sequence.

FIG. 4 shows a first configuration of a receiver of the radio communications system according to an embodiment of the present invention. A receiver 901 according to the first configuration has a configuration which is suitable for processing a pulse sequence whose pulse amplitude is altered pulse by pulse. In FIG. 4, reception means 902 comprise an RF circuit and the like, and receives a pulse sequence from the transmitter 801 by way of an antenna 909. A correlator 903 calculates a correlated value between a pulse from the reception means 902 and a reference pulse, and thereafter sends the calculated result to an amplifier 904. The amplifier 904 amplifies the output from the correlator 903. An integrator 905-1 integrates the amplified pulse. An A/D converter 905-2 converts the integrated pulse into a digital signal. A received signal processing section 906 performs channel-decoding on the digital signal. A control unit 907 controls the timing of signal processing and the like at each of the sections mentioned above.

The receiver 901 of the present embodiment further has an amplification factor alteration processing section 908. The amplification factor alteration processing section 908 alters the amplification factor of the amplifier 904 under the control of the control unit 907. This control operation will be described later. In practice, the control unit 907 may comprise a CPU, and the CPU may follow instructions from a program stored in a storage device not shown in drawing (for example, an EEPROM and the like), and accordingly control the amplification factor of the amplifier 904.

FIG. 5 shows a second configuration of a receiver in the radio communication system according to an embodiment of the present invention. A receiver 1001 of the second configuration has an appropriate configuration to process a pulse sequence whose amplitudes are altered by units of several pulses which correspond to the length of a spreading sequence length (for example, a pulse sequence corresponding to an information bit of 1 bit). In FIG. 5, reception means 1002 comprising an RF circuit and the like receive a pulse sequence from the transmitter 801 of FIG. 3 by way of an antenna 1009. A correlator 1003 calculates a correlated value between the pulse from the reception means 1002 and a reference pulse and sends the calculated result to an integrator 1004-1. The integrator 1004-1 integrates several pulses corresponding to the spreading sequence length. An A/D converter 1004-2 converts the integrated output into a digital signal. A weighting processing section 1005 performs weighting processing on the output in which pulses corresponding to the spreading sequence length are integrated. A received signal processing section 1006 performs channel-decoding and the like on the weighted signal. A control unit 1007 controls the timing of signal processing and the like at each of the sections mentioned above.

The receiver 1001 further has a weighting alteration processing section 1008, which performs a control function whereby a weighting value used by the weighting processing section 1005 is altered under the control of the control unit 1007. Th control function will be mentioned below. In practice, the control unit 1007 may comprise a CPU, and the CPU may follow instructions from a program stored in a storage device not shown in drawing (for example, an EEPROM), and accordingly operate to alter the weighting value in accordance with a predefined amplitude pattern.

Procedures of a radio communications scheme according to a first embodiment of the present invention are described below with reference to FIGS. 3, 4, and 6A to 6I.

In a radio communications scheme for communicating information using an impulse signal sequence, 1 bit of information to be communicated from a transmission end is transmitted by way of a plurality of impulses. In other words, the bit of information data 601 (FIG. 6A) to be communicated is directly spread using a predetermined spreading code 602 (FIG. 6B) at the transmission data processing section 802 to be converted into a spread signal 603 (FIG. 6C). In accordance with the binary value of the spread signal 603, the spread signal 603 is converted at the pulse generator 804 into a very fine pulse sequence. Thereafter, the pulse sequence is transmitted as the transmission signal 604 (FIG. 6D) by the transmission means 805.

In addition, with respect to the modulation method of the transmission signal 604 of the present embodiment, the explanation given above is such that it supposes a bi-phase modulation method which uses phase changes as the binary information of the impulse signal. However, a pulse position modulation method may also be applied in which a signal whose timing of generation of impulses is slightly offset corresponding to the binary information of a spread signal. Such a method is disclosed in PCT application publication number WO96/09694 which corresponds to published Japanese translation publication number 10-508725.

Here, in converting the spread signal 603 into a pulse sequence, the amplitude of each pulse is altered by the pulse amplitude altering means 807 in accordance with a predefined pattern. This pulse amplitude altering processing includes such a processing wherein the amplitude is 0, in other words, wherein the pulse is not transmitted.

FIG. 6E is an enlarged view of a portion 604-1 of the transmission signal 604 corresponding to the first few pulses thereof. As can be seen from this drawing, in the first embodiment, the amplitude of each pulse is altered in accordance with the predetermined pattern and the transmission signal 604 is transmitted thereafter.

On the receiving end, a signal in which a noise signal is superimposed onto the transmitted signal is received as a received signal 605 (FIG. 6F) by the reception means 902 by way of the antenna 909. The received signal 605 is despreaded using a predefined despreading code 606 (FIG. 6G). In other words, the received signal 605 is detected by the correlator 903, and a correlated output 607 (FIG. 6H) is thereby obtained.

When no amplification factor altering process is performed at the amplifier 904 at the next stage, signals such as those shown in FIG. 6H are sent to the integrator 905-1, where a spreading code is integrated to obtain an integrated output 608 (FIG. 6I). The integrated output 608 is inputted to the A/D converter (or a comparator) 905-2, and judging of the received data is performed.

On the other hand, because the control unit 907 is informed, in advance, of the pattern used on the transmission end (FIG. 6D), the control unit 907, by way of the amplification factor alteration processing section 908, is capable of controlling the amplification factor of the amplifier 804-2 in accordance with this pattern. In this case, the integrator 905-1 receives a signal in which the amplitude of each pulse is substantially unaltered as shown in FIG. 9H.

According to the first embodiment of the present invention described above, because the amplitude of each pulse is altered using a predetermined amplitude pattern before they are transmitted, it becomes possible to accurately discriminate the desired pulse from interfering pulses even when pulses from a plurality of transmitters are received simultaneously, thus making it possible to perform appropriate weighting on the received pulses. Therefore, the desired signal may be received in an appropriate manner.

Procedures of a radio communications scheme using an impulse signal sequence according to a second embodiment of the present invention is described below with reference to FIGS. 3, 5, and 7A to 7I.

In a radio communications scheme according to the present embodiments, 1 bit of information to be communicated from a transmission end is transmitted by way of a plurality of impulses. In other words, information bit data 701 (FIG. 7A) to be communicated is directly spread at the transmission data processing section 802 using a predetermined spreading code 702 (FIG. 7B) to be converted into a spread signal 703 (FIG. 7C). In accordance with the binary value of the spread signal 703, the spread signal 703 is converted at the pulse generator 804 into a very fine pulse sequence. Thereafter, the pulse sequence is transmitted as a transmission signal 704 (FIG. 7D) by the transmission means 805.

With respect to the modulation method of the transmission signal 704 of the present embodiment, the explanation given above is such that it supposes a bi-phase modulation method which uses phase changes as the binary information of the signal. However, a pulse position modulation method may also be applied in which a signal, whose timing of generation of the impulses is slightly offset corresponding to the binary information of a spread signal, is used. Such a method is disclosed in PCT application publication number WO096/09694 mentioned above.

Here, in converting the spread signal 703 into a pulse sequence, the amplitude of each pulse is altered by the pulse amplitude alteration means 807 in accordance with a predefined pattern. The pulse amplitude alterating process here includes an operation where the amplitude is set to 0, in other words, where the pulse is not transmitted.

FIG. 7E is an enlarged view of a portion 704-1 of the transmission signal 704 corresponding to the first few pulses thereof. As can be seen from this drawing, in the second embodiment, the amplitudes of a plurality of pulses (in this case, a number of pulses corresponding to the spread sequence length) are altered in accordance with the predetermined pattern and they are transmitted thereafter.

On the receiving end, a signal in which noise is superimposed on the transmission signal 704 is received as a received signal 705 (FIG. 7F) by the reception means 1002 via the antenna 1009. The received signal 705 is despreaded using a predefined despreading code 706 (FIG. 7G). In other words, the received signal 705 is detected by the correlator 1003, and a correlated output 707 (FIG. 7H) is obtained.

The correlated output 707 is integrated by the integrator 1004-1 in an amount corresponding to the spreading code length, and thus an integrated output 708 (FIG. 7I) is obtained. The A/D converter (or comparator) 1004-2 receives the integrated output 708 and performs judging of the received data.

When no weighting processing as mentioned above is performed at the weighting processing section 1005 at the next stage, a signal, which is the integrated output 708 shown in FIG. 7I converted into a digital signal, is sent to the received signal processing section 1006.

Because the control unit 1007 is informed, in advance, of the pattern used on the transmission end (FIG. 7D), the control unit, by way of the weighting alteration processing section 1008, is capable of controlling the weighting processing at the weighting processing section 1005 in accordance with this pattern. In this case, the received signal processing section 1006 receives a signal whose amplitude by units corresponding to the spreading sequence length is substantially unaltered.

At this point, the output from the correlator 1003 is compared with the pattern mentioned above. In accordance with the comparison result thereof, weighting of the estimated accuracy of the bit judgment of the received pulse is performed. In other words, when the amplitude of the received pulse is significantly greater than the expected amplitude, it is judged that this bit is affected by interference, and processings, such as concluding that a bit judgment of 0 or 1 is impossible, are performed.

According to the second embodiment of the present invention described above, because the amplitudes of the pulses are altered before transmission by units corresponding to the length of the spreading sequence in accordance with a predefined pattern, even in cases where pulses from a plurality of transmitters are simultaneously received, the desired pulse may be accurately discriminated from interfering pulses. Thus, appropriate weighting of the received pulses becomes possible.

In the examples above, the configurations of the transmitter and the receiver were such that a CPU serves as the control units 806, 907 and 1007, and performs control functions and the like based on a program stored in an EEPROM. However, the present invention is not limited thereto. For example, a program-storing medium on which the program is stored may be installed to the transmitter and the receiver, and control functions may be performed by the transmitter and the receiver.

The computer program-storing medium mentioned above is not limited to packaged media such as a flexible disk, a CD-ROM, or a digital versatile disk but also includes, for example, a semiconductor memory or a magnetic disk onto which a computer program is temporarily or permanently stored. Further, as to means for storing a program onto these program-storing media, wired or radio communications means such as a local area network (LAN), the Internet, a digital communications satellite or the like may be used to download the program, and the program may be written on a program-storing medium. Further, a communications unit such as a router or a modem may mediate the storing process.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A radio communications system for communicating information using an impulse signal sequence including impulses having a predetermined impulse period, comprising:
   a transmitter for generating said impulse signal sequence using a spread signal obtained by spreading an information bit to be transmitted, for generating an amplitude-controlled impulse signal sequence by controlling respective amplitudes of impulses of said impulse signal sequence in accordance with a predefined pattern, and for transmitting said amplitude-controlled impulse signal sequence; and
   a receiver for generating a correlated output signal from said amplitude-controlled impulse signal sequence transmitted by said transmitter and for controlling the amplitude of said correlated output signal in accordance with said predefined pattern,
   each of the impulses of said impulse signal sequence has a pulse width of approximately 1 nanosecond or less such that an occupied bandwidth is on the order of approximately 1 gigahertz or more, and
   the amplitude-controlled impulse signal sequence comprises a first plurality of impulses having a first amplitude and a second plurality of impulses having a second amplitude different from the first amplitude, in which at least one of the impulses included in the first plurality of impulses is separated from another impulse included in the first plurality of impulses by at least one impulse included in the second plurality of impulses.

2. A radio communications system for communicating information using an impulse signal sequence including impulses having a predetermined impulse period, comprising:
   a transmitter for generating said impulse signal sequence using a spread signal obtained by spreading an information bit to be transmitted, for generating an amplitude-controlled impulse signal sequence by controlling respective amplitudes of impulses of said impulse signal sequence in accordance with a predefined pattern, and for transmitting said amplitude-controlled impulse signal sequence; and
   a receiver for generating a correlated output signal from a received radio signal including said amplitude-controlled impulse signal sequence transmitted by said transmitter, for generating an information value from said correlated output signal, and for weighting said information value in accordance with said predefined pattern,
   each of the impulses of said impulse signal sequence has a pulse width of approximately 1 nanosecond or less such that an occupied bandwidth is on the order of approximately 1 gigahertz or more, and
   the amplitude-controlled impulse signal sequence comprises a first plurality of impulses having a first amplitude and a second plurality of impulses having a second amplitude different from the first amplitude, in which at least one of the impulses included in the first plurality of impulses is separated from another impulse included in the first plurality of impulses by at least one impulse included in the second plurality of impulses.

3. A transmitter of a radio communications system for communicating information using an impulse signal sequence including impulses having a predetermined impulse period, comprising:
   impulse signal sequence generating means for generating said impulse signal sequence based on a spread signal obtained by
   spreading an information bit to be transmitted using a spreading code;
   control means for controlling respective amplitudes of said impulses of said impulse signal sequence generated by said impulse signal sequence generating means accordance with a predefined pattern; and
   transmitting means for receiving said impulse signal sequence having impulses with controlled amplitudes from said impulse signal sequence generating means and for transmitting said impulse signal sequence having impulses with controlled amplitudes,
   each of the impulses of said impulse signal sequence has a pulse width of approximately 1 nanosecond or less such that an occupied bandwidth is on the order of approximately 1 gigahertz or more, and
   the amplitude controlled impulse signal sequence comprises a first plurality of impulses having a first amplitude and a second plurality of impulses having a second amplitude different from the first amplitude, in which at least one of the impulses included in the first plurality of impulses is separated from another impulse included in the first plurality of impulses by at least one impulse included in the second plurality of impulses.

4. The transmitter according to claim 3, wherein said control means controls the amplitudes of each of said impulses from said impulse signal sequence generating means.

5. The transmitter according to claim 3, wherein said control means controls the amplitudes of said impulses in groups formed of a plurality of said impulses from said impulse signal sequence generating means.

6. A receiver of a radio communications system for communicating information using an impulse signal sequence including impulses having a predetermined impulse period, comprising:
   radio reception means for receiving a radio signal including said impulse signal sequence having respective amplitudes of said impulses altered in accordance with a predefined pattern for obtaining a correlated output signal by correlating said radio signal and a spreading code;
   amplifying means for amplifying said correlated output signal; and
   control means for controlling an amplifying operation of said amplifying means based on said predefined pattern,
   each of the impulses of said impulse signal sequence has a pulse width of approximately 1 nanosecond or less such that an occupied bandwidth is on the order of approximately 1 gigahertz or more, and
   the impulse signal sequence comprises a first plurality of impulses having a first amplitude and a second plurality of impulses having a second amplitude different from the first amplitude, in which at least one of the impulses included in the first plurality of impulses is separated from another impulse included in the first plurality of impulses by at least one impulse included in the second plurality of impulses.

7. The receiver according to claim 6, wherein said control means controls the amplifying operation of said amplifying means for each one of said impulses.

8. A receiver of a radio communications system for communicating information using an impulse signal sequence including impulses having a predetermined impulse period, comprising:

radio reception means for generating a correlated output signal of a spreading code and a received radio signal including said impulse signal sequence having an amplitude of said impulses thereof altered based on a predefined pattern;

a weighting processing section for weighting an information value generated from said correlated output signal; and control means for controlling a weighting operation of said weighting processing section based on said predefined pattern, each of the impulses of said impulse signal sequence has a pulse width of approximately 1 nanosecond or less such that an occupied bandwidth is on the order of approximately 1 gigahertz or more, and the impulse signal sequence comprises a first plurality of impulses having a first amplitude and a second plurality of impulses having a second amplitude different from the first amplitude, in which at least one of the impulses included in the first plurality of impulses is separated from another impulse included in the first plurality of impulses by at least one impulse included in the second plurality of impulses.

9. The receiver according to claim 8, wherein said control means controls said weighting operation in groups of a plurality of said impulses.

10. A radio transmission method for communicating information using an impulse signal sequence including impulses having a predetermined impulse period, comprising the steps of:

generating said impulse signal sequence based on an information bit to be transmitted; and controlling respective amplitudes of said impulses of said generated impulse signal sequence in accordance with a predetermined pattern, each of the impulses of said impulse signal sequence has a pulse width of approximately 1 nanosecond or less such that an occupied bandwidth is on the order of approximately 1 gigahertz or more, and the amplitude controlled impulse signal sequence comprises a first plurality of impulses having a first amplitude and a second plurality of impulses having a second amplitude different from the first amplitude, in which at least one of the impulses included in the first plurality of impulses is separated from another impulse included in the first plurality of impulses by at least one impulse included in the second plurality of impulses.

11. The radio transmission method according to claim 10, wherein said step of controlling an respective amplitudes of said impulses is performed for each impulse.

12. The radio transmission method according to claim 10, wherein said step of controlling an respective amplitudes of said impulses is performed in groups formed of a plurality said impulses.

13. A radio reception method for communicating information using an impulse signal sequence including impulses having a predetermined impulse period, comprising the steps of:

receiving a radio signal including said impulse signal sequence having respective amplitudes of said impulses altered in accordance with a predefined pattern;

generating a correlated output signal of said radio signal and a spread signal;

amplifying said correlated output signal; and controlling an amplification factor in said step of amplifying based on said predefined pattern, each of the impulses of said impulse signal sequence has a pulse width of approximately 1 nanosecond or less such that an occupied bandwidth is on the order of approximately 1 gigahertz or more, and the impulse signal sequence comprises a first plurality of impulses having a first amplitude and a second plurality of impulses having a second amplitude different from the first amplitude, in which at least one of the impulses included in the first plurality of impulses is separated from another impulse included in the first plurality of impulses by at least one impulse included in the second plurality of impulses.

14. The radio reception method according to claim 13, wherein said controlling of said amplification factor is performed for each one of said impulses.

15. A radio reception method for communicating information using an impulse signal sequence including impulses having a predetermined impulse period, comprising the steps of:

receiving a radio signal including said impulse signal sequence having respective amplitudes of said impulses controlled according to a predefined pattern;

generating a correlated output signal by correlating said radio signal and a spread signal;

obtaining an information value from said correlated output signal;

weighting said information value; and controlling said step of weighting based on said predefined pattern, each of the impulses of said impulse signal sequence has a pulse width of approximately 1 nanosecond or less such that an occupied bandwidth is on the order of approximately 1 gigahertz or more, and the impulse signal sequence comprises a first plurality of impulses having a first amplitude and a second plurality of impulses having a second amplitude different from the first amplitude, in which at least one of the impulses included in the first plurality of impulses is separated from another impulse included in the first plurality of impulses by at least one impulse included in the second plurality of impulses.

16. The radio reception method according to claim 15, wherein said controlling of said weighting is performed in groups formed of a plurality of said impulses.

* * * * *

UNITED STATES PATENT AND TRADEMARK OFFICE
CERTIFICATE OF CORRECTION

PATENT NO. : 7,164,722 B2 Page 1 of 1
APPLICATION NO. : 10/216528
DATED : January 16, 2007
INVENTOR(S) : Kazuhisa Takamura It is certified that error appears in the above-identified patent and that said Letters Patent is hereby corrected as shown below:

In Column 1, Line 53, "is" should read --are--;

In Column 1, Line 59, "are" should read --is--;

In Column 7, Line 22, "is" should read --are--;

In Column 10, Line 12, insert --in-- after "means";

In Column 11, Line 56, delete "an";

In Column 11, Line 59, delete "an"; and

In Column 11, Line 61, insert --of-- before "said".

Signed and Sealed this

Twenty-seventh Day of November, 2007

JON W. DUDAS
*Director of the United States Patent and Trademark Office*